(12) United States Patent
Matsuda

(10) Patent No.: US 7,694,770 B2
(45) Date of Patent: Apr. 13, 2010

(54) LEISURE VEHICLE

(75) Inventor: Yoshimoto Matsuda, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 704 days.

(21) Appl. No.: 11/441,922

(22) Filed: May 25, 2006

(65) Prior Publication Data

US 2006/0272875 A1 Dec. 7, 2006

(30) Foreign Application Priority Data

May 27, 2005 (JP) ............................. 2005-155807

(51) Int. Cl.
*B62K 11/00* (2006.01)
(52) U.S. Cl. .................................... 180/219
(58) Field of Classification Search ................ 180/197, 180/219, 227
See application file for complete search history.

(56) References Cited

U.S. PATENT DOCUMENTS 7,458,915 B2 * 12/2008 Matsuda ..................... 477/107

2005/0121248 A1* 6/2005 Ushiroda et al. ............ 180/248
2005/0168063 A1* 8/2005 Tani et al. ................ 303/113.5

FOREIGN PATENT DOCUMENTS

| JP | 59-068538 | 4/1984 |
| JP | 63152054 U | 10/1988 |
| JP | 04-328032 | 11/1992 |
| JP | 09-249050 | 9/1997 |

\* cited by examiner

*Primary Examiner*—Lesley Morris
*Assistant Examiner*—Marc A Scharich
(74) *Attorney, Agent, or Firm*—Alleman Hall McCoy Russell & Tuttle LLP

(57) ABSTRACT

A leisure vehicle configured to be propelled by a friction between a drive wheel thereof and a ground surface with which the drive wheel is in contact, including a power unit configured to drive the drive wheel, a speed control device configured to control drive of the drive wheel, and a controller configured to control the speed control device to increase a rotational speed of the drive wheel while maintaining a state in which the drive wheel does not slip on the ground surface in a predetermined amount or more.

12 Claims, 9 Drawing Sheets

LEISURE VEHICLE

TECHNICAL FIELD

The present invention relates to a leisure vehicle such as a motorcycle, an ATV (all terrain vehicle), or a utility vehicle which is configured to run on the ground with wheels.

BACKGROUND ART

A leisure vehicle, for example, an ATV, typically runs with wheels on the ground through various conditions, such as sandy soil. In such cases, the ATV is more likely to start and accelerate on the sandy soil. Since a grip force between the wheels and a ground surface of the sandy soil is small, it is in many cases difficult to start or accelerate the vehicle without occurrence of a substantial slip. If a large drive force (rotational torque) is applied to a drive wheel during a start or during acceleration, the drive wheel tends to slip, making it difficult to achieve a smooth start or smooth acceleration. In such situations, a driver of the vehicle is required to manipulate an accelerator of the vehicle to cause a power unit such as an engine to drive the wheel with a small drive force (drive torque) during the start and to gradually increase the drive force after the start. During the acceleration of the vehicle, such manipulation of the accelerator is required to inhibit a substantial slip as well. Such a situation takes place when the vehicle is running on roads such as a snowy road, a muddy road, a wet road, and so on, because the grip force between the wheels and their ground surfaces is small (Publication of Japanese Examined Utility Model Application No. Hei. 5-9562).

SUMMARY OF THE INVENTION

The present invention addresses the above described conditions, and an object of the present invention is to provide a leisure vehicle capable of a smooth start or smooth acceleration on sandy soil, a snowy road and so on, where a grip force between a wheel thereof and a ground surface is small.

According to the present invention, there is provided a leisure vehicle configured to be propelled by friction between a drive wheel thereof and a ground surface with which the drive wheel is in contact; comprising: a power unit configured to drive the drive wheel; a speed control device configured to control drive of the drive wheel; and a controller configured to control the speed control device to increase a rotational speed of the drive wheel while maintaining a state in which the drive wheel does not slip on the ground surface in a predetermined amount or more.

In accordance with the leisure vehicle constructed above, when the rider/driver operates an accelerator of the vehicle during start or acceleration, the rotational speed of the power unit increases, which would normally cause the rotational speed of the drive wheel(s) to increase according to an operation amount of the accelerator. In such a case, the controller controls the speed control device to maintain a state in which the drive wheel does not slip on the ground surface in the predetermined amount or more. As a result, the leisure vehicle is able to start or accelerate without a substantial slip on sandy soil, a muddy road, a snowy road, and so on.

The leisure vehicle may further comprise a power unit rotational speed sensor unit configured to detect a rotational speed of the power unit; a non-drive wheel rotatably mounted separately from the drive wheel; and a non-drive wheel rotational speed sensor unit configured to detect a rotational speed of the non-drive wheel. The controller may be configured to control the speed control device to increase the rotational speed of the drive wheel while maintaining a state in which the drive wheel does not slip on the ground surface in the predetermined amount or more, when the rotational speed of the power unit is not smaller than a predetermined value and a value of data indicating the rotational speed of the non-drive wheel that is detected by the non-drive wheel rotational speed sensor unit is less than a predetermined value. In such a configuration, the state of the slip is able to be detected easily during start or acceleration of the leisure vehicle by using the power unit rotational speed sensor unit and the non-drive wheel rotational speed sensor unit. As a result, the leisure vehicle is able to start or accelerate without the occurrence of a slip of the drive wheel in the predetermined amount or more.

The controller may be configured to stop control of the speed control device when the value of the data indicating the rotational speed of the non-drive wheel that is detected by the non-drive wheel rotational speed sensor unit is not smaller than the predetermined value. The control process is carried out during start or acceleration and is stopped when the speed of the vehicle becomes a certain value or more. Therefore, the leisure vehicle is able to run in a desired condition according to the operation of the accelerator by the rider/driver.

The leisure vehicle may further comprise a drive wheel rotational speed sensor unit configured to detect a rotational speed of the drive wheel. The controller may be configured to compare a value of data indicating the rotational speed of the drive wheel that is detected by the drive wheel rotational speed sensor unit to the value of the data indicating the rotational speed of the non-drive wheel that is detected by the non-drive wheel rotational speed sensor unit to detect a state of slip. In this configuration, the state of slip of the drive wheel can be detected easily and accurately according to a ratio of the rotational speed of the drive wheel, which is more likely to slip depending on the drive force, to the rotational speed of the non-drive wheel, which is less likely to slip and freely rotates according to a running state of the engine.

The leisure vehicle may further comprise a power unit rotational speed sensor unit configured to detect a rotational speed of the power unit. The controller may be configured to control the speed control device so as not to increase the rotational speed of the power unit in a predetermined value or more even when the rider has operated the accelerator in a predetermined amount or more. Thereby, the leisure vehicle is able to start or accelerate without the occurrence of a slip in the predetermined amount or more with a simple configuration.

The leisure vehicle may further comprise a power unit rotational speed sensor unit configured to detect a rotational speed of the power unit; and a start sensor unit configured to detect that the leisure vehicle has started. The controller may be configured to control the speed control device to increase the rotational speed of the power unit at a predetermined change rate when the start sensor unit detects that the leisure vehicle has started. Thereby, the leisure vehicle is able to smoothly increase speed without the occurrence of a slip in the predetermined amount or more during start or acceleration, with a simple configuration.

The speed control device may be an actuator configured to open and close a throttle valve of the power unit.

The leisure vehicle may further comprise a clutch device that is disposed at a location of a power transmission path through which a drive force from the power unit is transmitted to the drive wheel and is configured to be turned to an on-state to permit the drive force from the power unit to be transmitted to the drive wheel or to an off-state to not permit the drive force from the power unit to be transmitted to the drive wheel. The speed control device may be an actuator configured to cause the clutch device to be turned to the on-state or the off-state. Thereby, in the leisure vehicle equipped with the clutch at the location of the power transmission path, the control process for start or acceleration is desirably carried out.

The leisure vehicle may further comprise a drive control button configured to be turned on or turned off by the rider. The controller may be configured to control the speed control device upon the drive control button being turned on. Thereby, the above mentioned control process is carried out according to the rider's will only when the control is required to be performed, for example, during start or during acceleration.

The leisure vehicle may further comprise a transmission having a plurality of gear positions; and a gear position sensor unit configured to detect a gear position of the transmission. The controller may be configured to control the speed control device when the gear position sensor unit has detected that the transmission is in a predetermined gear position. Thereby, the above mentioned control process is carried out only when the control is required to be performed, for example, during the start or the acceleration.

The above and further objects and features of the invention will more fully be apparent from the following detailed description with accompanying drawings.

DETAILED DESCRIPTION OF THE PREFERRED EMBODIMENTS

A leisure vehicle according to embodiments of the present invention will be described with reference to the accompanying drawings.

Embodiment 1

Figure 1:
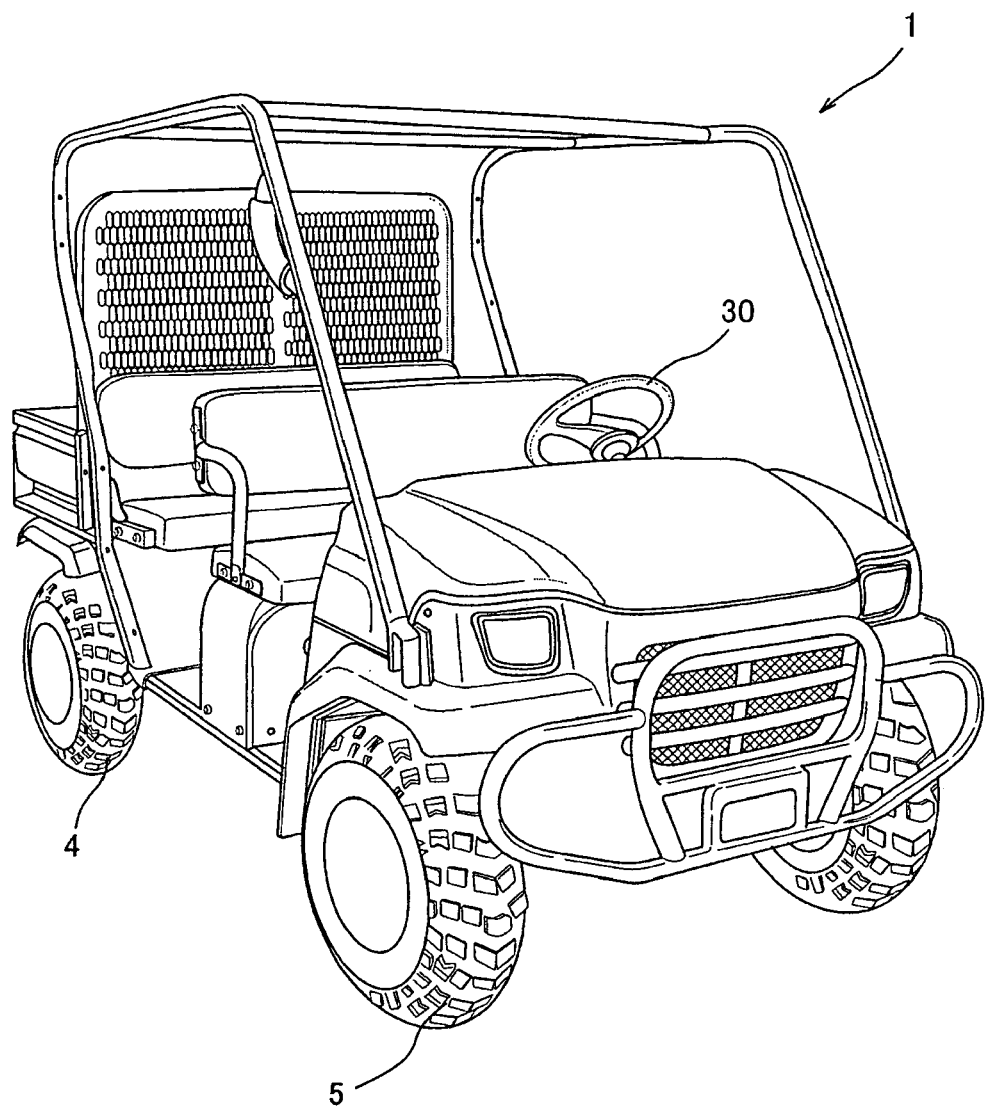
FIG. 1 is a perspective view showing an external construction of a utility vehicle according to an embodiment of the present invention.
Figure 2:
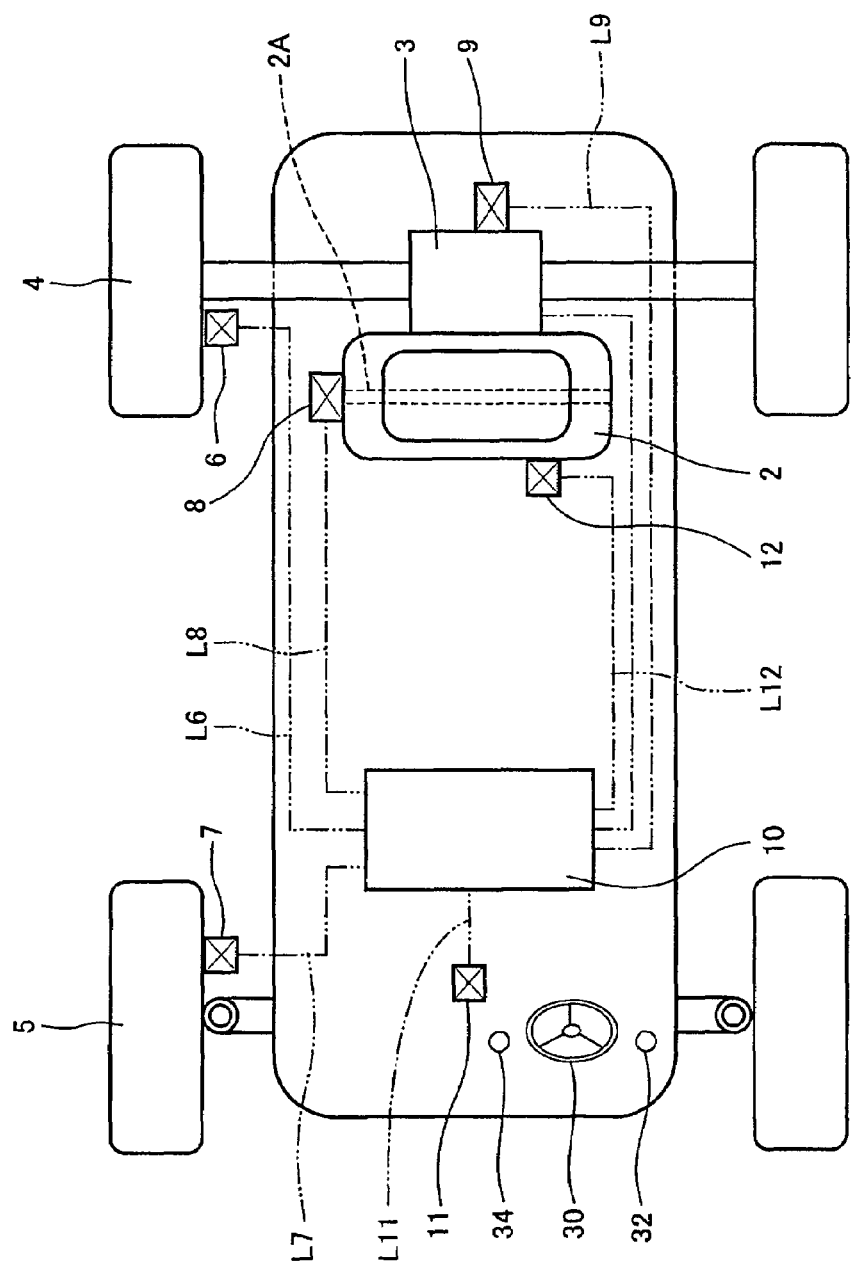
FIG. 2 is a block diagram showing a construction of the utility vehicle of FIG. 1.

Turning now to FIG. 1, a utility vehicle 1, which is one type of a leisure vehicle used for loading and unloading in farms or ranches, is shown. Turning to FIG. 1 or 2, a drive force from an internal combustion engine (hereinafter simply referred to as an engine) 2, which is a power unit, is transmitted to rear wheels 4 which are drive wheels. The drive force is transmitted through a transmission 3 to drive the rear wheels 4, enabling the utility vehicle 1 to drive. The transmission 3 has a plurality of gear positions. A steering handle 30 is mounted in a driver's seat section and is rotated clockwise or counter-clockwise within a predetermined angular range to steer front wheels 5 which are non-drive wheels (free wheels) to change a running direction freely.

A drive wheel rotational speed sensor unit 6 is attached to the rear wheel 4 and is configured to detect a rotational speed of the rear wheel 4. A non-drive wheel rotational speed sensor unit 7 is attached to the front wheel 5 and is configured to detect a rotational speed of the front wheel 5. An engine speed sensor unit 8 is attached to a crankshaft 2A of the engine 2 and is configured to detect a rotational speed of the crankshaft 2A (an engine speed of the engine E). A gear position sensor unit 9 is attached to the transmission 3 and is configured to detect a gear position.

The drive wheel rotational speed sensor unit 6, the non-drive wheel rotational speed sensor unit 7, the engine speed sensor unit 8, and the gear position sensor unit 9 are communicatively coupled to a controller 10 through control lines L6, L7, L8, and L9, respectively. A drive control button 11 is coupled to the controller 10 through a control line L11. The drive control button 11 is attached to a region near the driver's section, for example, a grip portion of a shift lever (transmission lever) 32 of the transmission 3. The drive control button 11 may alternatively be attached on, for example, a dash board or the steering handle 30 in the driver's section.

The controller 10 is coupled, through a control line L12, to an actuator 12 configured to open and close a throttle valve (not shown) of the engine 2. The actuator 12 is a speed control device configured to control the engine speed of the engine E. Under control of the controller 10, the actuator 12 is operated to change open and closed states of the throttle valve, thereby increasing and decreasing the engine speed of the engine 2.

The rotational speed of the rear wheel 4 may alternatively be detected based on the engine speed obtained by the engine speed sensor unit 8. In that case, the drive wheel rotational speed sensor unit 8 may be omitted.

In response to a rider's operation to turn on the drive control button 11, the controller 10 is configured to control the engine speed while maintaining a state in which the rear wheel 4 does not slip in a predetermined amount or more when the engine speed is a predetermined engine speed value or larger and a value of data detected by the non-drive wheel rotational speed sensor unit 7 is smaller than a predetermined value, i.e., the rotational speed of the front wheel 5 is smaller than the predetermined value. This control process will be later described in full.

The throttle valve is disposed in an air-intake device (throttle unit) (not shown) of the engine 2. The throttle valve is configured to be opened and closed by the rider's operation of an accelerator lever (or accelerator pedal) 34 disposed near the driver's section, as in general utility vehicles, as well as by the actuator 12. With the drive control button 11 in an on-state, the throttle valve is configured to be opened and closed under control of the controller 10 irrespective of the operation of the accelerator lever 34, namely, by limiting the operation of the accelerator lever 34, under a predetermined condition.

The rider shifts the shift lever 32 attached near the driver's section to change the gear position of the transmission 3. According to a predetermined deceleration ratio corresponding to each of the gear positions, the engine speed is decreased and in this state, the rear wheels 4 are rotated at an associated speed relative to a ground surface.

The utility vehicle 1 constructed above operates as described below when starting or running, for example, in a muddy road or the like. Below, the control process performed by the controller 10 and the associated operation of the utility vehicle 1 will be described.

For instance, when the utility vehicle 1 is ready to start on a ground surface on which the utility vehicle 1 is more likely to slip, the rider shifts the transmission 3 to a first gear position and turns on the drive control button 11, thereby causing the utility vehicle 1 to move to a control mode executed by the controller 10 as described above. Under this condition, the utility vehicle 1 is able to start without the occurrence of slip in the predetermined amount or more. To be specific, upon the rider's pressing down the accelerator lever 34 after the above operation, the engine 2 is going to increase the engine speed, for example, from an idling engine speed (650 r.p.m.) up to 1000 r.p.m., according to a press amount of the accelerator lever 34.

Figure 3:
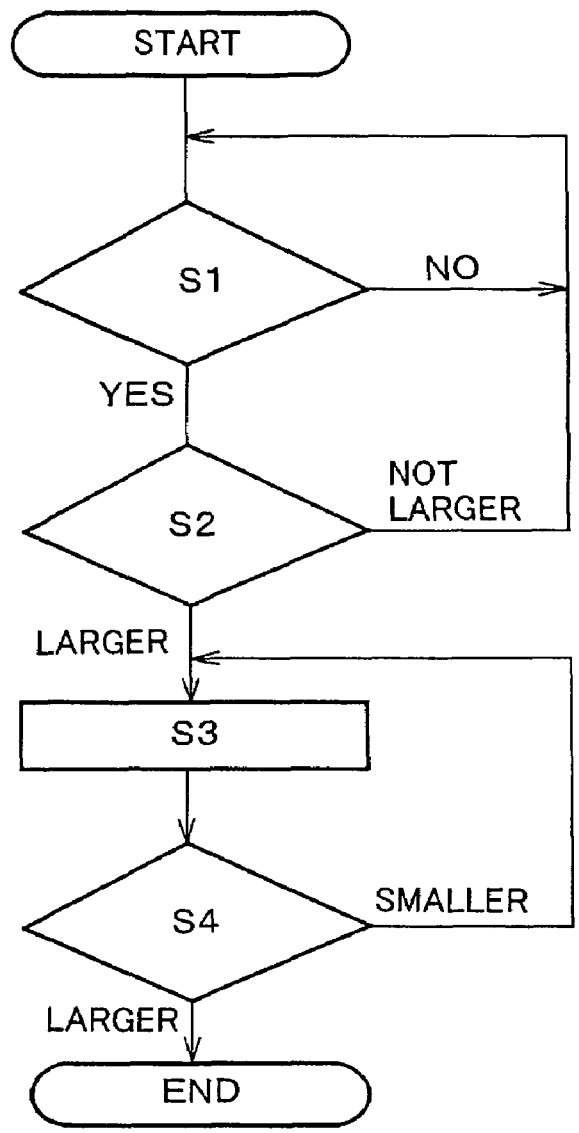
FIG. 3 is a flowchart schematically showing a control process performed during a start of the utility vehicle including the configuration of the block diagram of FIG. 2.

Under this condition, the controller 10 determines whether or not the drive control button 11 is in the on-state, whether or not the gear position of the transmission 3 is the first gear position, and whether or not the rotational speed of the front wheel 5 is smaller than the predetermined value, based on the data from the non-drive wheel rotational speed sensor unit 7 (step S1), as illustrated in the flowchart of FIG. 3.

If it is determined that the drive control button 11 is in the on-state, the gear position is the first gear, and the rotational speed of the front wheel 5 is smaller than the predetermined value in step S1, the controller 10 then determines whether or not the engine speed is larger than the predetermined value, for example, 750 r.p.m. which is larger than the idling engine speed in the first embodiment, based on the data from the engine speed sensor unit 8 (step S2). On the other hand, if it is determined that any of the above mentioned conditions is not met in step S1, the controller 10 repeats the step S1.

Figure 4:
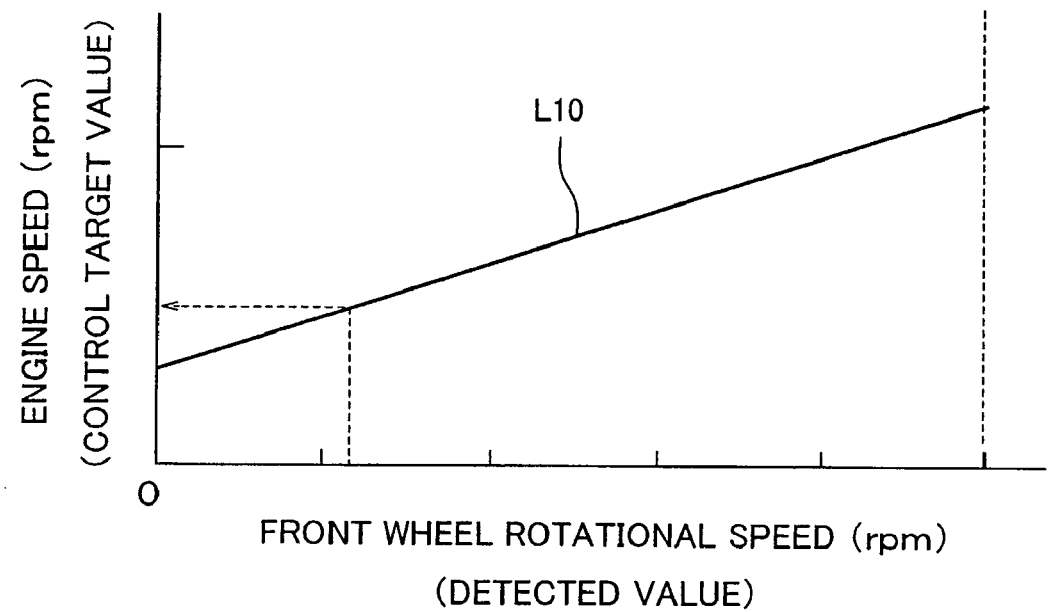
FIG. 4 is a graphic representation schematically showing an engine speed of an engine under control during the start of the utility vehicle of FIG. 1, in which a vertical axis indicates the engine speed (r.p.m.) and a horizontal axis indicates a rotational speed (r.p.m.) of a non-drive wheel of the utility vehicle.

If it is determined that the engine speed is larger than the predetermined value in step S2, then, the controller 10 detects the rotational speed of the front wheel 5 and controls the actuator 12 of the throttle valve according to the rotational speed of the front wheel 5 so that the engine speed becomes an engine speed corresponding to the rotational speed of the front wheel 5 with reference to a control map illustrated in FIG. 4, if the rotational speed of the front wheel 5 is smaller than the predetermined value, for example, 0.5 r.p.m. (step S3). In FIG. 4, a vertical axis indicates the engine speed and a horizontal axis indicates the rotational speed of the front wheel 5. In step S3, with reference to FIG. 4, when the rotational speed of the front wheel 5 is zero, the controller 10 controls the actuator 12 to operate so that the engine speed becomes a value of L10 at a zero point of the horizontal axis, for example, 700 r.p.m. The control map of FIG. 4 can be found in advance from a grip state of the rear wheel 4 with respect to the ground surface corresponding to the rotational speed of the drive wheel 4 of the utility vehicle 1.

On the other hand, if it is determined that the engine speed is not larger than the predetermined value in step S2, the controller 10 returns the process to step S1.

In the first embodiment, in order to decrease the engine speed, for example, from 1000 r.p.m., to 700 r.p.m., the controller 10 causes the actuator 12 to operate to decrease an opening degree of the throttle valve.

Alternatively, in order to decrease the engine speed, or to decrease the drive torque of the engine 2, the number of times an ignition plug of the engine 2 is ignited may be decreased, or otherwise an ignition timing may be retarded. The number of times of ignition of the ignition plug is decreased under control of an engine control unit (ECU) or the like in such a manner that ignition of the ignition plug is inhibited once per a predetermined number of rotations of the crankshaft 2A, for example, once per three rotations. Because the number of times of ignition of the ignition plug is able to be decreased or the ignition timing is able to be retarded to decrease the engine speed merely by changing a program stored in the ECU, the actuator 12 may be omitted, and thus the number of components can be decreased. As a result, manufacturing cost can be reduced and reliability can be improved.

Alternatively, the engine speed of the engine 2 may be controlled by a combination of changing the opening degree of the throttle valve, decreasing the number of times of ignition of the ignition plug, and retarding the ignition timing.

Then, the controller 10 determines whether or not a vehicle speed calculated from the rotational speed of the front wheel 5 that has been detected by the non-drive wheel rotational speed sensor unit 7 is larger than a predetermined value, for example, 5 km/h, based on the data from the non-drive wheel rotational speed sensor unit 7 attached on the front wheel 5 (step S4).

If it is determined that the vehicle speed is equal to or larger than the predetermined value, for example, 5 km/h or larger in step S4, the controller 10 terminates a series of control steps. This is because, it is determined that the start of the vehicle 1 in which a slip is more likely to occur, has ended, if the rotational speed of the front wheel 5 is larger than the predetermined value. On the other hand, if it is determined that the vehicle speed is smaller than the predetermined value, for example, 5 km/h in step S4, the controller 10 returns the process to step S3 and executes the above mentioned control steps. If the start state has ended, the engine 2 thereafter runs at an engine speed according to a press amount of the accelerator lever 34 of the rider, without use of the control process for the start of the utility vehicle 1.

If the rider turns off the drive control button 11 or upshifts the shift lever 32 to a second gear position even under the control process being performed by the controller 10 for the start of the utility vehicle 1, the controller 10 terminates the series of control steps for the start.

Whereas in the first embodiment, the controller 10 controls the engine speed according to the rotational speed of the front wheel 5 with reference to the control map of FIG. 4, it may alternatively control the engine speed as described below in a second or third embodiment.

During an acceleration state of the vehicle 1 at lower gear positions (first gear position, second gear position, and so on) with higher drive torques, a slip may be detected and the control process may be performed to inhibit the occurrence of an undesired slip, as in the start of the vehicle 1.

Embodiment 2

In a second embodiment, the controller 10 detects the rotational speed of the front wheel 5 which is the non-drive wheel and the rotational speed of the rear wheel 4 which is the drive wheel from the non-drive wheel rotational speed sensor unit 7 and the drive wheel rotational speed sensor unit 6, respectively, and increases the engine speed at a predetermined rate, for example, 20 revolutions per second when a ratio of the rotational speed of the rear wheel 4 to the rotational speed of the front wheel 5 (rotational speed of the rear wheel 4/rotational speed of the front wheel 5) is smaller than a predetermined value, for example, 1.05. On the other hand, when the ratio of the rotational speed is the predetermined value or larger, for example, 1.05 or larger, the controller 10 determines that the rear wheel 4 has slipped in a predetermined amount or more, and decreases the engine speed so that the ratio of the rotational speed of the rear wheel 4 to the rotational speed of the front wheel 5 decreases to, for example, a value smaller than 1.05, at which slip is assumed to be within a predetermined range. In this manner, precise control is able to be performed to inhibit a substantial slip of the rear wheel 4. Furthermore, more precise control is performed as described below.

Embodiment 3

The controller 10 may increase or decrease the engine speed so as to correspond to the ratio of the rotational speed between the rear wheel (drive wheel) 4 and the front wheel (non-drive wheel) 5. Specifically, for example, the controller 10 may increase the engine speed at a rate of 20 revolutions per second when the ratio is 1.0, increase the engine speed at a rate of 10 revolutions per second when the ratio is not smaller than 1.0 and smaller than 1.005, and increase the engine speed at a rate of 5 revolution per second when the ratio is not smaller than 1.005 and smaller than 1.02. Furthermore, the controller 10 may maintain the engine speed of the engine 2 at that point of time when the ratio is not smaller than 1.02 and smaller than 1.03 and decrease the engine speed so that the ratio of the rotational speed becomes a value that is not smaller than 1.02 and smaller than 1.03, when the ratio is not smaller than 1.03. These numeric values are merely exemplary and may be suitably set depending on desired performance or use of the vehicle. The start state may be controlled more simply as described below in fourth and fifth embodiments.

Embodiment 4

Using the engine speed sensor unit 8 that detects the engine speed, the actuator 12 that controls the engine speed, and the drive control button 11, which are illustrated in FIG. 2, the controller 10 is able to accomplish a simple control process as described below. Even when the rider operates the accelerator lever 34 to move the throttle valve to a predetermined degree or more with the drive control button 11 being in an on-state during start of the vehicle 1, the controller 10 controls the actuator 12 so that the throttle valve does not move up to an opening degree corresponding to a certain engine speed. More specifically, for example, even when the rider operates the accelerator lever 34 so that the engine speed becomes 2000 r.p.m., the controller 10 causes the actuator 12 to operate to increase the engine speed only at a rate of 20 revolutions per second until the engine speed reaches 1000 r.p.m. As a result, the vehicle 1 is able to start without the occurrence of substantial slip.

Embodiment 5

Using the engine speed sensor unit 8 that detects the engine speed of the engine 2, the actuator 12 that controls the engine speed, the drive control button 11, and the non-drive wheel rotational speed sensor unit 7 that detects the rotational speed of the front wheel 5 which is the non-drive wheel, which are illustrated in FIG. 2, the controller 10 is able to accomplish a simple control process as described below.

When the rider operates accelerator lever 34 to enable the vehicle 1 to start with the drive control button 11 being in an on-state, and the non-drive wheel rotational speed sensor unit 7 detects that the vehicle 1 has started, the controller 10 may control the actuator 12 to increase the engine speed to a predetermined value at a constant rate. For example, the controller 10 may cause the actuator 12 to operate so as to increase the engine speed only at a rate of 20 revolutions per second until the engine speed reaches, for example, 1000 r.p.m. As a result, the vehicle 1 is able to start without the occurrence of a substantial slip. Thus, in the fourth and fifth embodiments, the vehicle 1 is able to start without a slip in a predetermined amount or more with simple configurations.

In each of the above mentioned embodiments, the controller 10 controls the engine speed during the start only when the gear position is the first gear position in which a reduction gear ratio is the greatest. Alternatively, the controller 10 may control the engine speed during the start when the gear position is other than the first gear position, for example, a second gear position, or otherwise may control the engine speed during the start when the gear position is any of the first to third gear positions depending on the type of the vehicle. Furthermore, during acceleration, the controller 10 may control the engine speed to inhibit the occurrence of a substantial slip in the same manner. Whereas in the above mentioned embodiments, the controller 10 controls the engine speed to inhibit the occurrence of a substantial slip only when the drive control button 11 is in an on-state, the drive control button 11 may be omitted and the controller 10 may control the engine speed upon detecting the occurrence of a slip of the drive wheel with the above mentioned configuration.

Embodiment 6

The utility vehicle 1 in the above embodiments is equipped with a centrifugal clutch attached at a location of a power transmission path through which a drive force from the engine 2 is transmitted to the rear wheel 4. The clutch is configured to be automatically turned to an on-state when the engine speed becomes a predetermined value or larger to thereby permit the drive force from the engine 2 to be transmitted to the rear wheel 4. The present invention is applicable to leisure vehicles including a utility vehicle equipped with a hand-operated clutch device (also simply referred to as a clutch device) that is attached at a location of the power transmission path.

In the leisure vehicle equipped with the clutch device configured to be hand-operated to be turned to an on-state or to an off-state, the controller 10 executes a control process as described below. The construction of the embodiment 6 is substantially identical to that of the embodiment 1 except that the clutch device is attached at a location of a power transmission path, and therefore, description will be given below assuming that the vehicle 1 of FIG. 1 has the clutch device.

The clutch device (not shown) is hand-operated by the rider to cause the clutch to be turned to the on-state or to the off-state. During the start of the vehicle 1, the rider causes the clutch device to be turned to the on-state at a time point when the engine speed becomes a predetermined value or more. When the rider operates the accelerator lever 34 and the clutch is turned to the on-state, the drive force is transmitted from the engine 2 to the rear wheel 4. At this time, a slip may occur depending on a relationship between the grip force of the rear wheel 4 with respect to the ground surface and the drive force (drive torque) applied to the rear wheel 4. For this reason, when the clutch is operated to be turned to the on-state during a start of movement of the vehicle, the controller 10 carries out a series of control steps to control the engine speed to cause the rear wheel 4 to rotate with a drive force corresponding to a grip force of the rear wheel 4 within a range of an operation amount of the accelerator lever 34. As a result, the vehicle 1 is able to start or accelerate without the occurrence of a slip in a predetermined amount or more.

Figure 6:
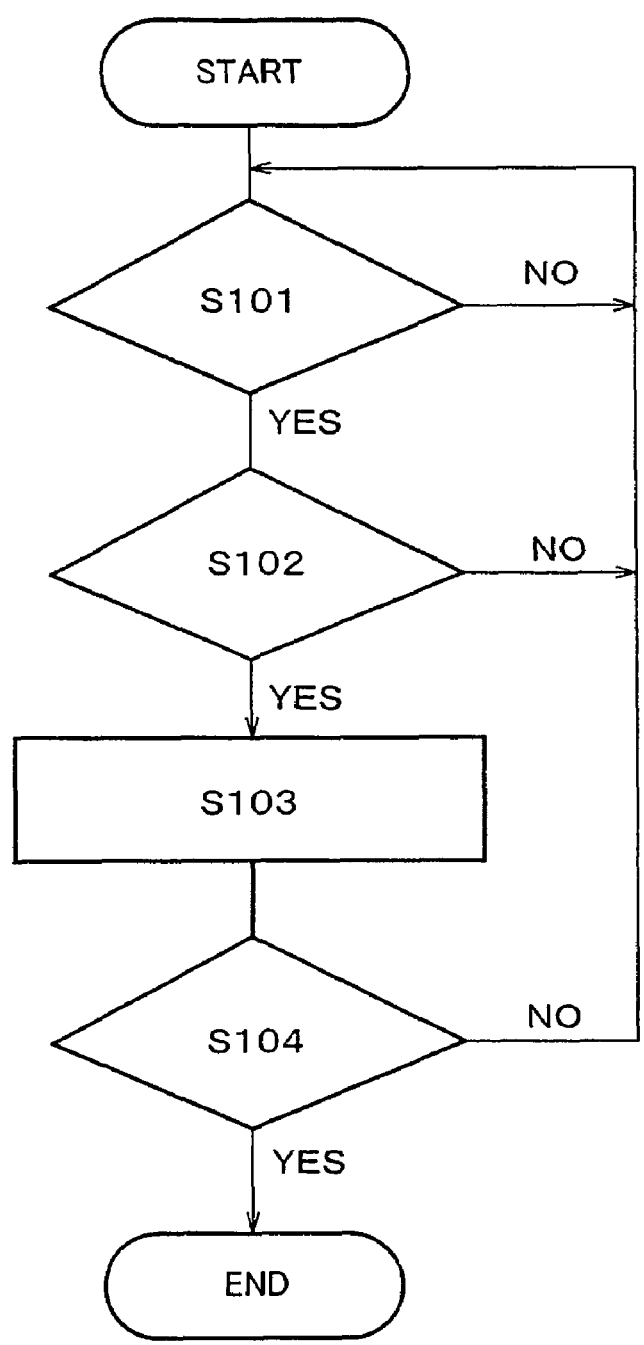
FIG. 6 is a flowchart showing a control process performed during start according to another embodiment.

The control process performed during a start of movement of the vehicle will be described. Turning to a flowchart of FIG. 6, the controller 10 determines whether or not the drive control button 11 is in the on-state, whether or not the gear position of the transmission 3 is a predetermined gear position, for example, the first gear position, and whether or not the rotational speed of the front wheel 5 is smaller than a predetermined value, i.e., a vehicle speed is smaller than a predetermined vehicle speed, based on the data from the non-drive wheel rotational speed sensor unit 7 (step S101).

If it is determined that all the above conditions are met in step S101, the controller 10 further determines whether or not the engine speed is larger than a predetermined value, for example, 750 r.p.m. which is the idling engine speed, from the data from the engine speed sensor unit 8 (step S102). On the other hand, if it is determined that any of the above conditions is not met in step S101, the controller 10 repeats the step S101.

If it is determined that the engine speed is larger than 750 r.p.m. in step S102, the controller 10 detects the rotational speed of the front wheel 5, and causes the actuator 12 to operate to move the throttle valve to achieve an engine speed corresponding to the rotational speed of the front wheel 5 with reference to the control map illustrated in FIG. 4 in step S103. To be specific, for example, in step S103, if the rotational speed of the front wheel 5 is zero, the controller 10 causes the actuator 12 to operate so that the engine speed becomes 1000 r.p.m. which is a value corresponding to zero of the rotational speed of the front wheel 5 in the control map of FIG. 4. As in the embodiment 1, the control map used for controlling the engine speed corresponding to the rotational speed of the front wheel 5 is able to be found in advance from the grip state on the ground surface corresponding to each rotational speed of the rear wheel 4 which is the drive wheel of the motorcycle. The control map of FIG. 4 is used to find a controlled value of the engine speed by horizontally extending a position where the rotational speed of the front wheel 5 crosses a control line L10. A program of a calculation formula corresponding to the control map may be stored in the controller 10.

On the other hand, if it is determined that the engine speed is not larger than 750 r.p.m. in step S102, the controller 10 returns the process to step S101.

In step S103, in order to decrease the engine speed to 1000 r.p.m., the controller 10 causes the actuator 12 to operate to decrease an opening degree of the throttle valve.

Alternatively, in order to decrease the engine speed to 1000 r.p.m., the number of times of ignition of the ignition plug of the engine 2 may be decreased, or otherwise the ignition timing may be retarded, as in the embodiment 1. In addition, as in the embodiment 1, the engine speed may be controlled by a combination of decreasing the opening degree of the throttle valve, decreasing the number of times of ignition, and retarding the ignition timing.

Then, the controller 10 determines whether or not a vehicle speed calculated from the rotational speed of the front wheel 5 that has been detected by the non-drive wheel rotational speed sensor unit 7 is larger than a predetermined value, for example, 50 km/h, based on the data from the non-drive wheel rotational speed sensor unit 7 attached on the front wheel 5 (step S104).

If it is determined that the vehicle speed is equal to or larger than the predetermined value, for example, 50 km/h or larger in step S104, the controller 10 terminates a series of control steps for inhibiting occurrence of a slip. This is because, it is determined that the start of the vehicle in which slip is more likely to occur, has ended, if the rotational speed of the front wheel 5 is larger than the predetermined value.

On the other hand, if it determined that the vehicle speed is smaller than the predetermined value, for example, 50 km/h in step S104, the controller 10 returns the process to step S101. Because of such a control, the rear wheel 4 does not slip in a predetermined amount or more even if the rider operates the accelerator lever 34 to a great amount in a range of a vehicle speed smaller than 50 km/h in which a large drive torque is applied to the rear wheel 4. As a result, the vehicle 1 is able to start or accelerate efficiently without a loss of drive force. The illustrated 50 km/h in the embodiment 6 is merely exemplary and the numeric value may be 80 km/h, or otherwise may be larger or smaller than 80 km/h.

If the start state has ended, the engine 2 thereafter runs at an engine speed according to an operation amount of the accelerator lever 34 of the rider, without the series of control steps performed for the start.

During the control process, if the rider turns off the drive control button 11 or upshifts the shift lever 32 to a second gear position, the controller 10 terminates the series of control steps.

With the shift lever 32 in the second gear position or in the third gear position, the controller 10 may carry out the control process to inhibit the occurrence of a substantial slip in the same manner, as in the first gear position.

Figure 9:
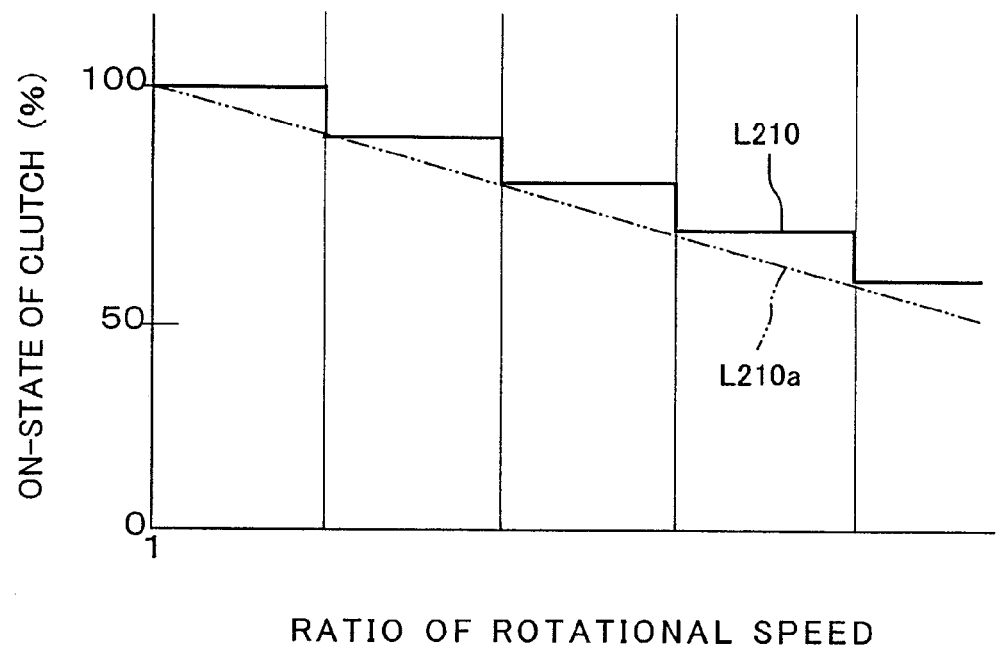
FIG. 9 is a graphic representation showing an engine speed under control for the start of the motorcycle of FIGS. 7 and 8, in which a vertical axis indicates an on-state (%) of a clutch and a horizontal axis indicates a ratio of a rotational speed of a rear wheel to a rotational speed of a front wheel.

Instead of controlling the engine speed based on the control map of FIG. 4 as described in the embodiment 6, the controller 10 may control the engine speed based on an actual slip state according to a ratio of the rotational speed between the rear wheel 4 which is the drive wheel or the crankshaft 2A of the engine 2 and the front wheel 5 which is the non-drive wheel as in the embodiment 2 or the embodiment 3, and with reference to a control map illustrated in FIG. 9. Thereby, precise control is able to be achieved to inhibit occurrence of a slip.

When the vehicle 1 is equipped with the clutch device as illustrated in the embodiment 6, an actuator for causing the clutch device to be turned to an on-state or to an off-state may be used as the speed control device. In this case, the actuator controls the on-state or off-state of the clutch of the clutch device, namely, a semi-order clutch condition of the clutch device to achieve a state in which a substantial slip does not occur in the rear wheel 4. In that case, the engine speed may depend on the rider's operation of the accelerator lever 34 without a need to control the engine speed. In an alternative embodiment, the engine speed may be optimally controlled along with the control for turning on and off the clutch device.

As described above in the embodiments 1 to 6, the speed control device may be the actuator configured to open and close the throttle valve or otherwise the actuator mounted to the clutch device to control an on-state and an off-state of the clutch device. Alternatively, these actuators may be used in combination.

The present invention is applicable to other leisure vehicles such as motorcycles and ATVs, in addition to the utility vehicle 1 of FIG. 1. In the case of the motorcycle, the same effects are produced during acceleration as well as during a start, for example, on a wet ground surface where the grip force is smaller. Below, the series of control steps during acceleration will be described.

Embodiment 7

Figure 5:
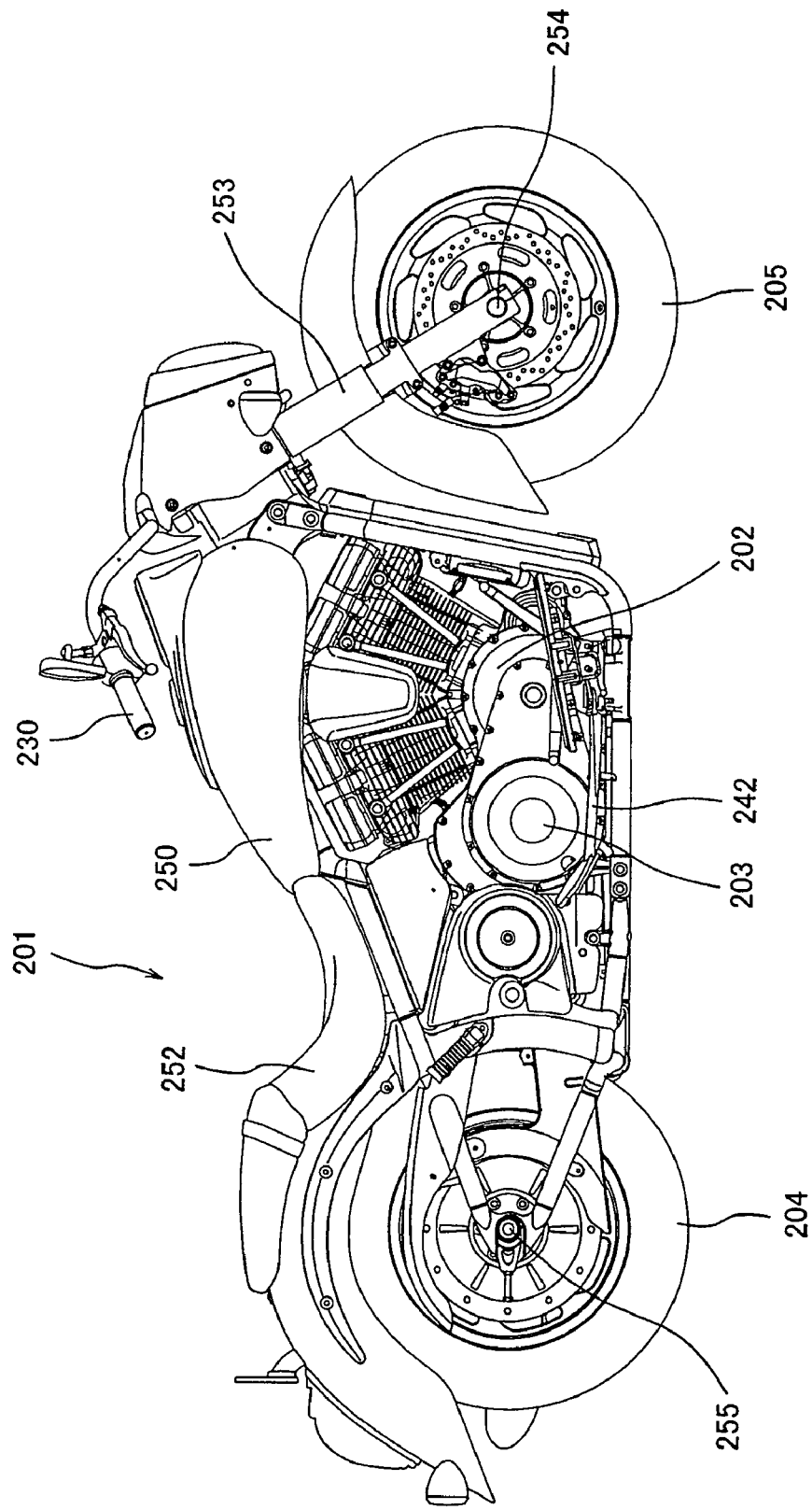
FIG. 5 is a side view showing an external construction of a motorcycle which is one type of a leisure vehicle of the present invention.
Figure 7:
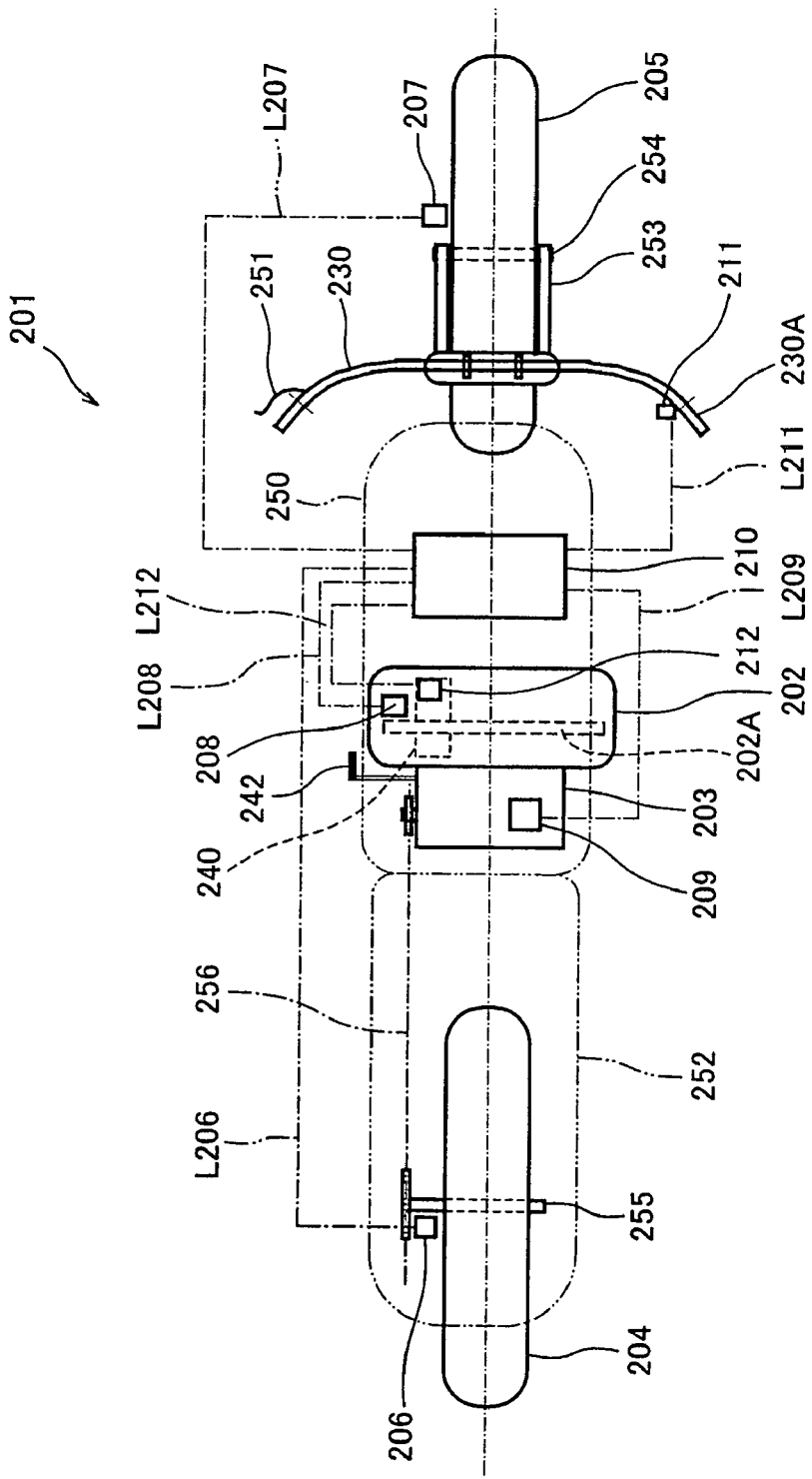
FIG. 7 is a block diagram schematically showing a construction of a motorcycle of FIG. 5.

Turning now to FIG. 5, a motorcycle 201 which is one type of leisure vehicle is shown. As shown in FIG. 7, a drive force from an internal combustion engine (hereinafter simply referred to as an engine) 202 which is a power unit is transmitted to a rear wheel 204 which is a drive wheel through a transmission 203 to drive the rear wheel 204, enabling the motorcycle 201 to run. The transmission 203 has a plurality of gear positions. A bar-type steering handle 230 is mounted above a front wheel 205 which is a non-drive wheel (free wheel) and is configured to be rotated to the right or to the left to a predetermined angle around a steering shaft of the steering handle 230, wherein changing the direction of the front wheel 205 changes a running direction to the right or to the left. In this manner, the motorcycle 201 is steered.

A drive wheel rotational speed sensor unit 206 is attached on the rear wheel 204 and is configured to detect a rotational speed of the rear wheel 204. A non-drive wheel rotational speed sensor unit 207 is attached on the front wheel 205 and is configured to detect a rotational speed of the front wheel 205. An engine speed sensor unit 208 is attached on a crankshaft 202A of the engine 202 and is configured to detect an engine speed of the engine 202. A gear position sensor unit 209 is attached on the transmission 203 and is configured to detect a gear position of the transmission 203.

The drive wheel rotational speed sensor unit 206, the non-drive wheel rotational speed sensor unit 207, the engine speed sensor unit 208, and the gear position sensor unit 209 are communicatively coupled to a controller 210 through control lines L206, L207, L208, and L209, respectively. A drive control button 211 is coupled to the controller 210 through a control line L211. The drive control button 211 is attached to a region near a rider's section, for example, a grip portion 230A at a right end portion of the handle 230. The drive control button 211 may alternatively be attached on other suitable position near the rider's section to enable the rider to easily operate the button 211 during running of the motorcycle.

The controller 210 is coupled, through a control line L212, to an actuator 212 (speed control device) configured to operate a clutch device 240 to control a drive force transmitted to the rear wheel 204. Under control of the controller 210, the actuator 212 is operated to change an on-state or an off-state of the clutch device 240, thereby increasing or decreasing the drive force (engine speed or drive torque) transmitted from the engine 202 to the rear wheel 204.

The rotational speed of the rear wheel 204 may alternatively be detected based on the rotational speed obtained by the engine speed sensor unit 208. In that case, the drive wheel rotational speed sensor unit 206 may be omitted, as in the embodiment 1. In FIG. 5 and FIG. 7, reference symbol 250 denotes a fuel tank, 251 denotes a clutch lever that is configured to be hand-operated to operate the clutch device 240, 252 denotes a seat, 253 denotes a front fork, 254 denotes an axle of the front wheel 205, 255 denotes an axle of the rear wheel 204, and 256 denotes a drive chain coupling an output shaft of the transmission 203 to the axle 255 of the rear wheel 204.

In response to the rider's operation to turn on the drive control button 211, the controller 210 is configured to control the engine speed to maintain a state in which the rear wheel 204 does not slip in a predetermined amount or more when the engine speed is a predetermined value or larger and a value of data indicating the rotational speed of the front wheel 205 that is detected by the non-drive wheel rotational speed sensor unit 207 is smaller than a predetermined value. This control process will be later described in full.

In addition to controlling the actuator 212, the clutch device 240 may be configured to be turned to the on-state or off-state by the rider's operation to manipulate the clutch lever 251 attached at an end portion of the handle 230, as in general motorcycles. With the drive control button 211 being in the on-state, the clutch device 240 is turned to an on-state or an off-state depending on the operation of the actuator 212 under the control of the controller 210 irrespective of the on-operation of the clutch lever 251, namely by limiting the on-operation of the clutch lever 251.

The rider operates the shift lever 242 attached laterally of the engine 202 to change the gear position of the transmission 203 to a desired gear position. The engine speed of the engine 202 is decreased according to a predetermined deceleration ratio corresponding to each gear position, and in this state, the rear wheel 204 is driven to be rotated relative to the ground surface.

The motorcycle 201 of the embodiment 7 constructed above operates as described below when it is starting or accelerating on a ground surface on which a slip is more likely to occur. The operation will be described below along with the control process performed by the controller 210.

For example, when the motorcycle 201 is starting on the ground surface on which the motorcycle 201 is more likely to slip, the rider shifts the transmission 203 to the first gear position and turns on the drive control button 211. Thereby, the motorcycle 201 enters a control mode as described below and is able to start without the occurrence of a slip in a predetermined amount or more. After the control process for the start has been terminated and a predetermined condition is met, then the control process for acceleration starts. To be specific, when the rider rotates an accelerator operation grip (generally, a grip at a right end of the handle) to operate an accelerator of the engine, the engine speed increases from an idling engine speed (650 r.p.m.) to 1300 r.p.m., according to an operation amount of the grip.

Figure 8:
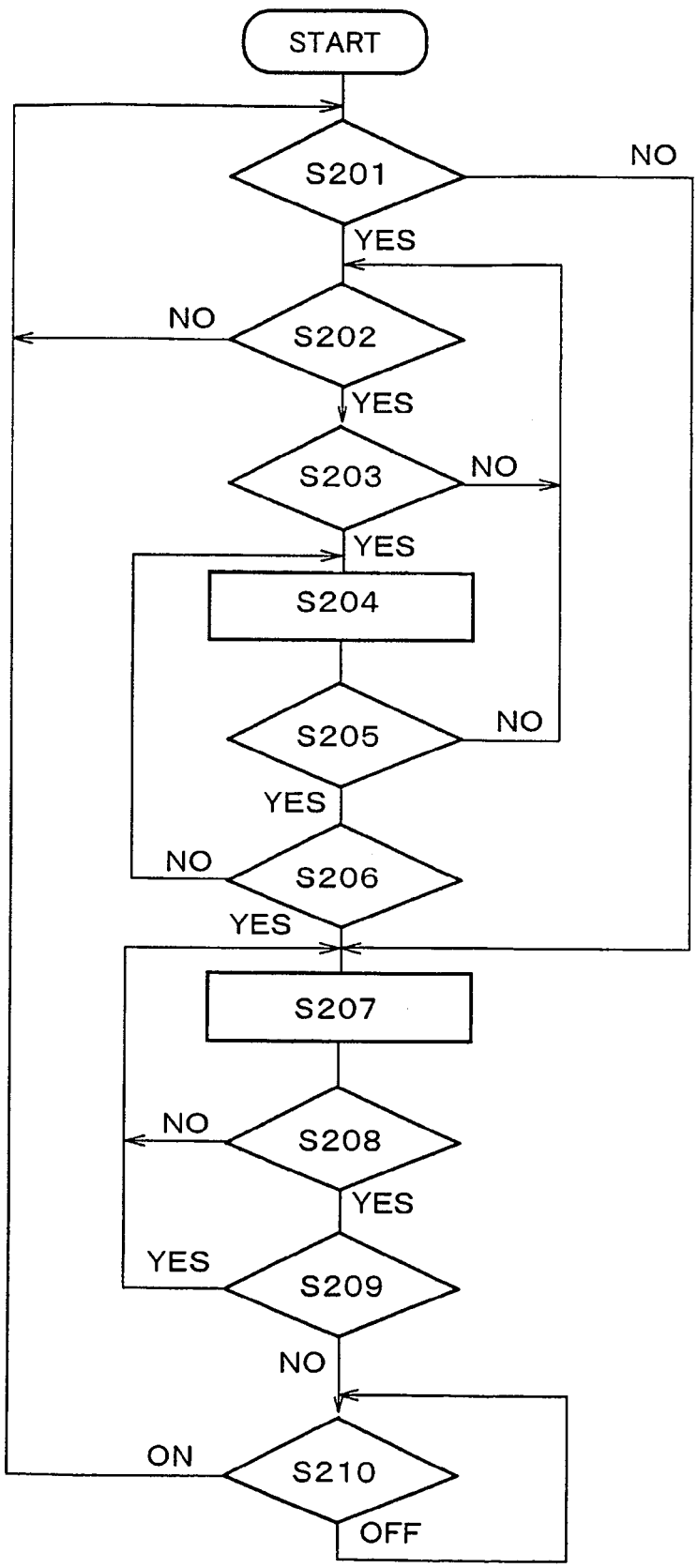
FIG. 8 is a flowchart schematically showing a control process during start and acceleration of the motorcycle including the configuration of the block diagram of FIG. 7.

Under this condition, as illustrated in the flow chart of FIG. 8, the controller 210 determines whether or not the motorcycle 201 is running at a predetermined speed or lower, for example, 50 km/h or lower, based on the data from the non-drive wheel rotational speed sensor unit 207 in step S201.

If it is determined that the motorcycle 201 is running at a speed higher than the predetermined speed ("No" in step S201), the controller 210 transitions the process to step S207.

On the other hand, if it is determined that the motorcycle 201 is running at the predetermined speed or lower ("Yes" in step S201), the controller 210 transitions the process to step S202. In step S202, the controller 210 determines whether or not the drive control button 211 is in an on-state, whether or not the transmission 203 is in a first gear position in which a reduction gear ratio is the greatest, based on the data from the gear position sensor unit 209, and whether or not the rotational speed of the front wheel 205 which is the non-drive wheel is smaller than a predetermined value based on the data from the non-drive rotational speed sensor unit 207.

If it is determined that all of the above mentioned conditions are met in step S202, the controller 210 then determines whether or not the engine speed is larger than a predetermined value, for example 750 r.p.m. which is larger than an idling engine speed, based on the data from the engine speed sensor unit 208 (step S203).

On the other hand, if any of the above conditions is not met in step S202, the controller 210 returns the process to step S201.

If it is determined that the engine speed is larger than the predetermined value in step S203 ("Yes" in step S203), then the controller 210 enters a control mode for the start and carries out a control process described later (step S204). To be specific, in step S204, the controller 210 detects the rotational speed of the front wheel 205 and the rotational speed of the rear wheel 204 from the non-drive wheel rotational speed sensor unit 207 and the drive wheel rotational speed sensor unit 208, respectively. If it is determined that a ratio of the rotational speed of the rear wheel 204 to the rotational speed of the front wheel 205 is smaller than a predetermined value, for example, 1.05, the controller 210 determines that a slip does not substantially occur in the rear wheel 204, and cause the actuator 212 to operate the clutch device 240 to turn to a 100% on-state to enable the whole of the drive force from the engine 202 to be transmitted to the rear wheel 204. On the other hand, if it is determined that the ratio of the rotational speed falls in a predetermined range, for example, not smaller than 1.05 and smaller than 1.10, the controller 210 determines that an undesired slight slip has occurred in the rear wheel 204, and causes the actuator 212 to operate the clutch device to turn to a 90% on-state so that 90% of the drive force from the engine 202 is transmitted to the rear wheel 204.

If it is determined that the ratio is more than the above predetermined range, for example, not smaller than 1.10 and smaller than 1.15, the controller 210 determines that a slip has occurred in the rear wheel 204 to a larger amount, and causes the actuator 212 to operate the clutch device 240 to turn to a 80% on-state so that that 80% of the drive force from the engine 202 is transmitted to the rear wheel 204. Furthermore, if it is determined that the ratio is more than the above predetermined range, i.e., not smaller than 1.15 and smaller than 1.20, the controller 210 determines that a slip has occurred on the rear wheel 204 to a larger amount, and causes the actuator 212 to operate the clutch device 240 to turn to a 70% on-state so that that 70% of the drive force from the engine 202 is transmitted to the rear wheel 204.

As should be understood from the above, the controller 210 causes the actuator 212 to variably operate the clutch device 240 in order to minimize a slip. Such control is desirably decided with reference to a control table containing a control line L210 in a step form indicated by a solid line of FIG. 9, showing a part of a state of the actuator 212 under control of the controller 210. Rather than the control line L210 in the step form, a straight control line L210a indicated by a two-dotted line in FIG. 9 may be employed. In that case, precise control is able to be achieved.

If it is determined that the engine speed is not larger than the predetermined value ("No" in step S203), the controller 210 returns the process to step S202.

In this embodiment, a desired on-state or off-state of the clutch device 240 is able to be achieved by operating the actuator 212 to cause the clutch device 240 to be turned from an on-state to an off-state or from an off-state to an on-state.

Then, the controller 210 determines whether or not a vehicle speed calculated from the rotational speed of the front wheel 205 that is detected by the non-drive wheel rotational speed sensor unit 207 is larger than a predetermined value, for example, 50 km/h in the case of the motorcycle 201, based on the data from the non-drive wheel rotational speed sensor unit 207 (step S205).

If it is determined that the vehicle speed is equal to or larger than the predetermined value, for example, 50 km/h or larger ("Yes" in step S205), the controller 210 terminates a series of control steps for the start and advances the process to step S206. This is because, it is determined that a start state of the motorcycle 201 in which a slip is more likely to occur, has ended, if the rotational speed of the front wheel 205 is larger than the predetermined value.

On the other hand, if it is determined that the vehicle speed is smaller than the predetermined value, for example, 50 km/h ("No" in step S205), the controller 210 returns the process to step S202.

In step S206, the controller 210 determines whether or not the drive control button 211 is in an on-state and the gear position has been upshifted to a predetermined gear position or more, for example, a fourth gear position or more (step S206).

If it is determined that the conditions are met ("Yes" in step S206), the controller 210 executes the control step identical to that of the step S204 (step S207). To be specific, the controller 210 detects the rotational speed of the front wheel 205 and the rotational speed of the rear wheel 204 from the non-drive wheel rotational speed sensor unit 207 and the drive wheel rotational speed sensor unit 206, respectively, and controls the on-state of the clutch device 240 so that a slip does not occur in a predetermined amount or more between the rear wheel 204 and the ground surface. As in the step S204, the controller 210 causes the actuator 212 to suitably operate the clutch device 240 to achieve a desired on-state.

On the other hand, if it determined that the any of the conditions is not met in step S206, the controller 206 returns the process to step S204, and performs step S204 and the following steps.

Then, the controller 206 determines whether or not the drive control button 211 has been turned off and whether or not the gear position has been upshifted to a predetermined gear position, for example, the fourth gear position (step S208).

If it is determined that the drive control button 211 has been turned off and the gear position has been upshifted to the fourth gear position in step S208, the controller 210 terminates the control mode for the acceleration and transitions the process to step S209.

On the other hand, if it is determined that the drive control button 211 is in an on-state and the gear position is smaller than the fourth gear position in step S208, the controller 210 returns the control process to step S207, and continues the control mode for acceleration.

In step S209, the controller 210 determines whether or not the gear position has been downshifted to smaller than the fourth gear position.

If it is determined that the gear position has been downshifted in step S209, the controller 210 transitions the process to step S207 and executes the control mode for acceleration.

If it is determined that the gear position has not been downshifted in step S209, the controller 210 transitions the process to step S210.

In step S210, the controller 210 determines whether or not the drive control button 211 is in the off state (step S210).

If it is determined that the drive control button 211 is in the on-state in step S210, the controller 210 returns the process to step S201.

On the other hand, if it is determined that the drive control button 211 is in the off-state in step S210, the controller 210 leaves the control mode. Thereafter, the motorcycle 201 runs depending on the operation of the accelerator and the clutch operation by the rider, and the step 210 is repeated at predetermined time intervals, for example, of 0.01 second.

In the embodiment 7, unless the drive control button 211 is turned off, the controller 210 carries out the control process for a start of movement of the vehicle when the gear position is the first gear position, or carries out the control process for acceleration when the gear position is not smaller than the second gear position and smaller than the fourth gear position, namely, when a drive force applied to the rear wheel 204 is large. As a result, when the gear position is smaller than the fourth gear position at which a large drive force is generated, the motorcycle 201 is able to run without the occurrence of a slip in a predetermined amount or more. The illustrated gear positions are merely exemplary and the control process for the acceleration may be carried out when the gear position is smaller than a third gear position or smaller than a fifth gear position. The gear position may be suitably changed depending on the user or performance of the motorcycle.

Whereas the actuator 212 of the clutch device 240 is used as the speed control device in the embodiment 7, the actuator of the throttle valve may alternatively be used as the speed control device in the embodiment 7 as in the embodiments 1 to 6, rather than the actuator 212 of the clutch device 240. Furthermore, the engine speed may be decreased by decreasing the number of times of ignition of the engine.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A motorcycle configured to be propelled by a friction between a drive wheel thereof and a ground surface with which the drive wheel is in contact; comprising:
    a power unit configured to drive the drive wheel, the drive wheel being a rear wheel;
    a speed control device configured to control drive of the drive wheel;
    a controller configured to control the speed control device to increase a rotational speed of the drive wheel while maintaining a state in which the drive wheel does not slip on the ground surface in a predetermined amount or more of slip;
    a power unit rotational speed sensor unit configured to detect a rotational speed of the power unit;
    a non-drive wheel rotatably mounted separately from the drive wheel; and
    a non-drive wheel rotational speed sensor unit configured to detect a rotational speed of the non-drive wheel;
    wherein the controller is configured to control the speed control device to increase the rotational speed of the drive wheel while maintaining a state in which the drive wheel does not slip on the ground surface in the predetermined amount or more, when the rotational speed of the power unit is not smaller than a predetermined value and when a value of data indicating the rotational speed of the non-drive wheel that is detected by the non-drive wheel rotational speed sensor unit is less than a predetermined value.

2. The motorcycle according to claim 1, wherein the controller is configured to stop control of the speed control device when the value of the data indicating the rotational speed of the non-drive wheel that is detected by the non-drive wheel rotational speed sensor unit is not smaller than the predetermined value.

3. The motorcycle according to claim 1, further comprising:
    a drive wheel rotational speed sensor unit configured to detect a rotational speed of the drive wheel;
    wherein the controller is configured to compare a value of data indicating the rotational speed of the drive wheel that is detected by the drive wheel rotational speed sensor unit to the value of the data indicating the rotational speed of the non-drive wheel that is detected by the non-drive wheel rotational speed sensor unit to detect a state of slip.

4. The motorcycle according to claim 3, wherein the controller is configured to stop control of the speed control device when the value of the data indicating the rotational speed of the drive wheel that is detected by the drive wheel rotational speed sensor unit is not smaller than the predetermined value.

5. A motorcycle configured to be propelled by a friction between a drive wheel thereof and a ground surface with which the drive wheel is in contact; comprising:
    a power unit configured to drive the drive wheel, the drive wheel being a rear wheel;
    a speed control device configured to control drive of the drive wheel;
    a controller configured to control the speed control device to increase a rotational speed of the drive wheel while maintaining a state in which the drive wheel does not slip on the ground surface in a predetermined amount or more of slip;
    a non-drive wheel rotatably mounted separately from the drive wheel;
    a non-drive wheel rotational speed sensor unit configured to detect a rotational speed of the non-drive wheel; and
    a drive wheel rotational speed sensor unit configured to detect a rotational speed of the drive wheel;
    wherein the controller is configured to compare a value of data indicating the rotational speed of the drive wheel that is detected by the drive wheel rotational speed sensor unit to a value of the data indicating the rotational speed of the non-drive wheel that is detected by the non-drive wheel rotational speed sensor unit to detect a state of slip.

6. The motorcycle according to claim 5, wherein the controller is configured to stop control of the speed control device when the value of the data indicating the rotational speed of the drive wheel that is detected by the drive wheel rotational speed sensor unit is not smaller than a predetermined value.

7. A motorcycle configured to be propelled by a friction between a drive wheel thereof and a ground surface with which the drive wheel is in contact; comprising:
    a power unit configured to drive the drive wheel, the drive wheel being a rear wheel;
    a speed control device configured to control drive of the drive wheel;
    a controller configured to control the speed control device to increase a rotational speed of the drive wheel while maintaining a state in which the drive wheel does not slip on the ground surface in a predetermined amount or more of slip; and
    a power unit rotational speed sensor unit configured to detect a rotational speed of the power unit;
    wherein the controller is configured to control the speed control device so as not to increase the rotational speed of the power unit to a predetermined value or more even when a rider has operated an accelerator of the power unit in a predetermined amount or more.

8. A motorcycle configured to be propelled by a friction between a drive wheel thereof and a ground surface with which the drive wheel is in contact; comprising:
    a power unit configured to drive the drive wheel, the drive wheel being a rear wheel;

a speed control device configured to control drive of the drive wheel;

a controller configured to control the speed control device to increase a rotational speed of the drive wheel while maintaining a state in which the drive wheel does not slip on the ground surface in a predetermined amount or more of slip;

a power unit rotational speed sensor unit configured to detect a rotational speed of the power unit; and a start sensor unit configured to detect that the motorcycle has started movement;

wherein the controller is configured to control the speed control device to increase the rotational speed of the power unit at a predetermined change rate when the start sensor unit detects that the motorcycle has started movement.

9. A motorcycle configured to be propelled by a friction between a drive wheel thereof and a ground surface with which the drive wheel is in contact; comprising:

a power unit configured to drive the drive wheel, the drive wheel being a rear wheel;

a speed control device configured to control drive of the drive wheel; and a controller configured to control the speed control device to increase a rotational speed of the drive wheel while maintaining a state in which the drive wheel does not slip on the ground surface in a predetermined amount or more of slip;

wherein the speed control device is an actuator configured to open and close a throttle valve of the power unit.

10. A motorcycle configured to be propelled by a friction between a drive wheel thereof and a ground surface with which the drive wheel is in contact; comprising:

a power unit configured to drive the drive wheel, the drive wheel being a rear wheel;

a speed control device configured to control drive of the drive wheel;

a controller configured to control the speed control device to increase a rotational speed of the drive wheel while maintaining a state in which the drive wheel does not slip on the ground surface in a predetermined amount or more of slip; and a clutch device that is disposed at a location of a power transmission path through which a drive force from the power unit is transmitted to the drive wheel and is configured to be turned to at least one of an on-state to permit the drive force from the power unit to be transmitted to the drive wheel and an off-state to not permit the drive force from the power unit to be transmitted to the drive wheel;

wherein the speed control device is an actuator configured to cause the clutch device to be turned to the on-state or the off-state.

11. A motorcycle configured to be propelled by a friction between a drive wheel thereof and a ground surface with which the drive wheel is in contact; comprising:

a power unit configured to drive the drive wheel, the drive wheel being a rear wheel;

a speed control device configured to control drive of the drive wheel;

a controller configured to control the speed control device to increase a rotational speed of the drive wheel while maintaining a state in which the drive wheel does not slip on the ground surface in a predetermined amount or more of slip; and a drive control button configured to be turned on or turned off by the rider;

wherein the controller is configured to control the speed control device upon the drive control button being turned on.

12. The motorcycle according to claim 11, further comprising:

a transmission having a plurality of gear positions;

a gear position sensor unit configured to detect a gear position of the transmission;

wherein the controller is configured to control the speed control device when the gear position sensor unit has detected that the transmission is in a predetermined gear position.

* * * * *